United States Patent [19]

MacDermid

[11] Patent Number: 4,613,412
[45] Date of Patent: Sep. 23, 1986

[54] EVACUATOR SYSTEM AND PROCESS FOR AN EVAPORATIVE RECOVERY SYSTEM

[75] Inventor: John T. MacDermid, Plymouth, Conn.

[73] Assignee: Wastesaver Corporation, Plymouth, Conn.

[21] Appl. No.: 674,553

[22] Filed: Nov. 26, 1984

[51] Int. Cl.[4] .............................................. B01D 3/10
[52] U.S. Cl. ........................................ 203/91; 203/11; 203/DIG. 14; 203/DIG. 18; 203/DIG. 25; 134/12; 134/109; 137/205; 159/43.1; 159/44; 202/174; 202/185.2; 202/202; 202/205; 204/DIG. 13; 417/148; 417/149
[58] Field of Search ............... 202/205, 174, 176, 202, 202/181, 160, 185.2; 204/DIG. 13; 364/501; 203/DIG. 14, 25, 11, 91, 1, 99, 94, 98, 4, DIG. 25, DIG. 18; 417/149, 148, 118; 134/10–12, 109; 137/205; 159/44, 43.1, 43.2, DIG. 40, DIG. 16; 141/85

[56] References Cited

U.S. PATENT DOCUMENTS

| | | | |
|---|---|---|---|
| 2,976,814 | 3/1961 | Ver Planck et al. | 417/149 |
| 3,319,578 | 5/1967 | Ware | 417/148 |
| 3,424,186 | 1/1969 | Sparks | 417/148 |
| 3,616,437 | 10/1971 | Yagishita et al. | 202/205 |
| 3,640,331 | 2/1972 | Yagishita | 159/43.2 |
| 3,826,718 | 7/1974 | Takayasu | 159/43.2 |
| 3,883,269 | 5/1975 | Wolff | 417/149 |
| 4,057,364 | 11/1977 | Bratschitsch | 417/149 |
| 4,194,924 | 3/1980 | Safranko et al. | 203/DIG. 14 |
| 4,290,446 | 9/1981 | Seiler | 137/205 |
| 4,408,960 | 10/1983 | Allen | 417/149 |

Primary Examiner—Wilbur Bascomb
Attorney, Agent, or Firm—Prutzman, Kalb, Chilton & Alix

[57] ABSTRACT

An evacuator system employed in an evaporative waste recovery system uses an eductor to create a partial vacuum. The partial vacuum is selectively employed to evacuate concentrate and distillate from an evaporator unit for transferal to respective concentrate and distillate containers. A plurality of air operated valves are automatically operated to transfer concentrate and distillate for reuse in a plating process system.

9 Claims, 4 Drawing Figures

EVACUATOR SYSTEM AND PROCESS FOR AN EVAPORATIVE RECOVERY SYSTEM

BACKGROUND OF THE INVENTION

This invention relates to a new and improved evacuator system for transferring liquids in an evaporative recovery system. More particularly, this invention relates to a new and improved evacuator system for transferring for reuse distilled water and reconcentrated chemicals which have been recovered from rinse water effluent.

The present invention is an evacuator system which is efficiently integrated into an evaporative recovery system such as the type of system employed in recycling metal finishing chemicals and rinse water obtained by means of a low temperature vacuum distillation process. In conventional metal finishing systems parts to be plated or finished are submerged in a plating bath and successively rinsed in a sequence of rinse tanks. The resulting rinse water effluent or waste may be recycled to an evaporator unit wherein the effluent is subjected to a partial vacuum under a relatively low temperature below the boiling point of water to provide a distillate of essentially pure distilled water and a concentrate liquid of reconcentrated chemicals. By returning the distillate and the reconcentrated chemicals to the plating system for reuse a number of economies are achieved. The reclaimed chemicals can be reused thus lessening the cost of required chemicals. The recycling of the distilled water represents a savings in the quantity of water required for the metal processing system. In addition, the recycling of the chemicals and the distilled water eliminates costly waste disposal and facilitates compliance with environmental regulations.

Because the chemicals involved in the chemical plating process are often quite corrosive, an effective and efficient waste recovery system must be designed to minimize the corrosive effects of the chemicals as well as the corrosive fumes given off by the chemicals and the waste water effluent. In particular electromechanical pumps are easily damaged and corroded by frequent exposure to plating materials and other chemical wastes. It is therefore an object of the present invention to provide an evacuator system which eliminates the requirement of electromechanical pumps.

The efficiency of a waste recovery system is additionally a function of the degree with which various operational parameters such as the temperature of the evaporator unit, the partial vacuum of the evaporative unit, and the chemical concentration level, can be effectively controlled. A computer controlled system is advantageous for controlling the waste recovery process so that the wastes may be recovered in an efficient and reliable manner and to insure the quality and purity of the recovered products. An additional feature of the evacuator system of the present invention is that the system is efficiently integrated into an automatic computer controlled system for recycling rinse water effluent for reuse in a chemical plating system.

BRIEF SUMMARY OF THE INVENTION

Briefly stated, the invention in a preferred form is an automatic evacuator system for transferring liquids in an evaporative recovery system. The evacuator system comprises an evaporator which includes an evaporator chamber for receiving waste or a source material in the form of rinse water effluent and forming a concentrate and a distillate from the material by an evaporative process. The evaporative process includes forming a partial vacuum within the chamber and subjecting the material to a temperature sufficient to effect an evaporation of the material. An eductor means is employed to produce a partial vacuum source. A generally fluid tight concentrate container selectively communicates with a concentrate region of the evaporator, the partial vacuum source, and a pressurized air source. A first conduit valve selectively permits liquid communication between the concentrate region of the evaporator and the concentrate container. A first vacuum valve selectively permits fluid communication between the concentrate container and the partial vacuum source. A first air valve selectively permits the passage of pressurized air into the concentrate container. A generally fluid tight distillate container selectively communicates with the distillate region of the evaporator, a partial vacuum source, and the pressurized air source. A second conduit valve selectively permits liquid communication between the distillate region of the evaporator and the distillate container. A second vacuum valve selectively permits the fluid communication between the distillate container and the partial vacuum source. A second air valve selectively permits passage of pressurized air into the distillate container. A control assembly is provided to automatically control the first and second conduit valves, vacuum valves and air valves so that concentrate and distillate are selectively evacuated from the evaporator to respective concentrate and distillate containers and purged therefrom.

The valves are preferably air actuated valves and the control assembly includes a plurality of solenoids which are actuable for controlling the valves in response to signals from a computer.

An object of the invention is to provide a new and improved evacuator system for an evaporative recovery system.

Another object of the invention is to provide a new and improved evacuator system which does not require electromechanical pumps.

A further object of the invention is to provide a new and improved evacuator system which may be automatically operated by a computer for efficiently transferring recovered liquids from an evaporator unit for reuse by a plating system.

Other objects and advantages of the invention will become apparent from the specification and the drawing.

DETAILED DESCRIPTION OF THE INVENTION

Figure 1:
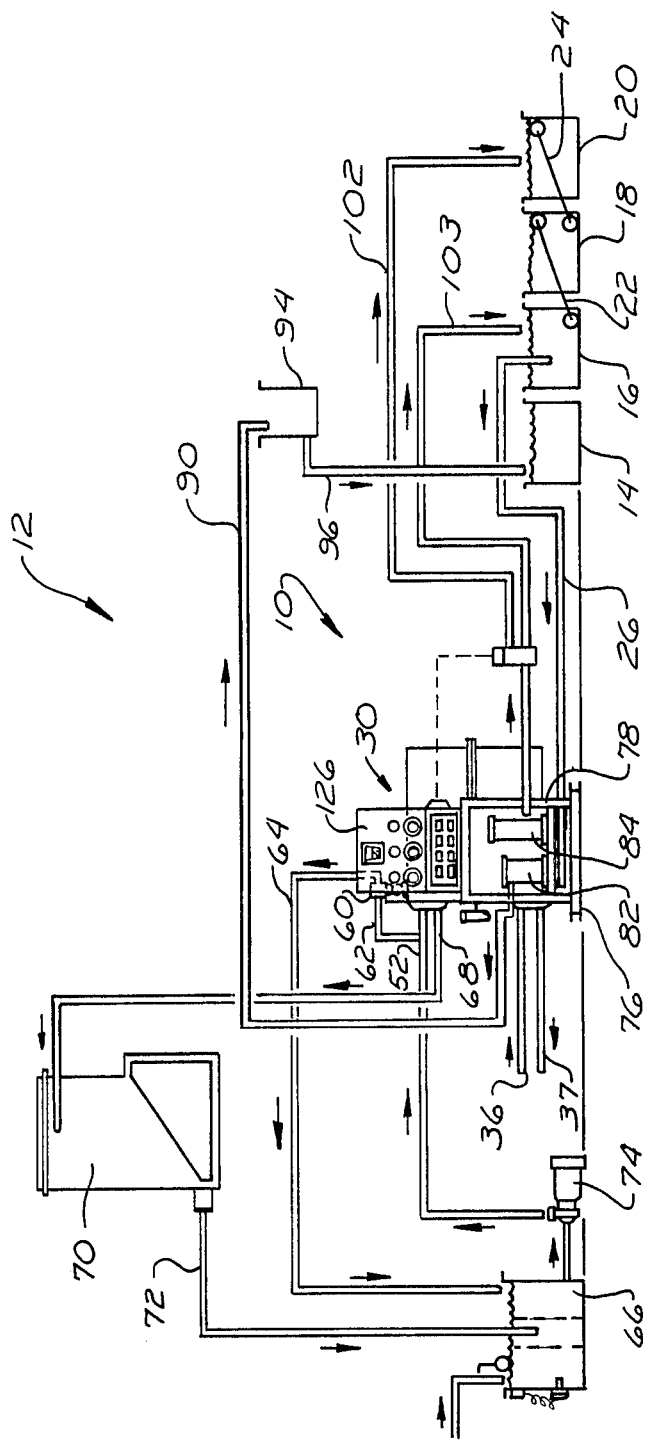
FIG. 1 is a schematic drawing of a recovery system employing the evacuator system of the present invention.
Figure 2:
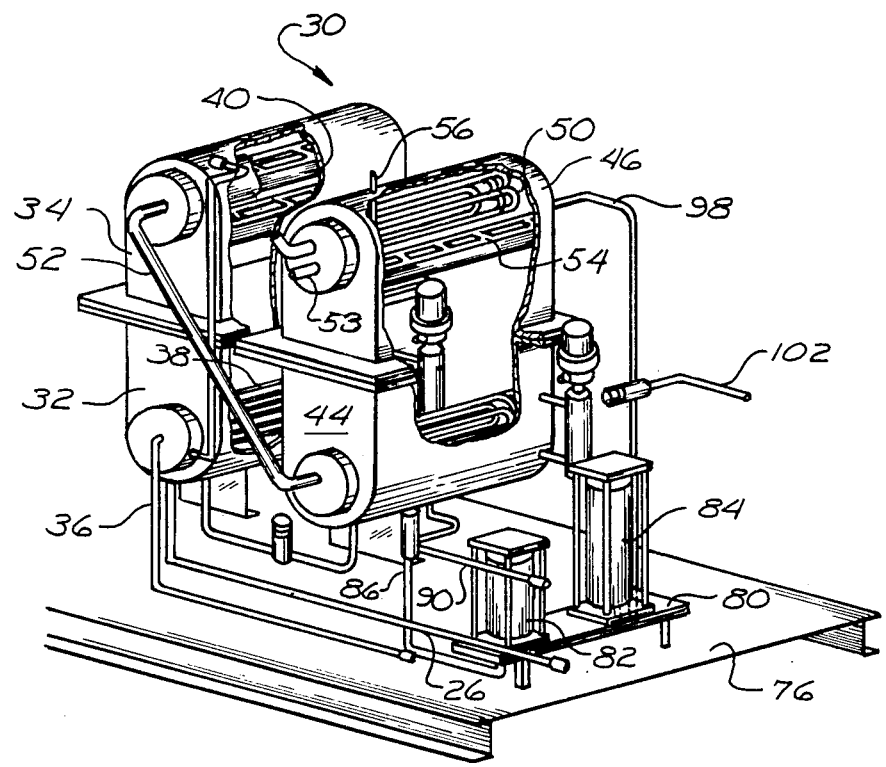
FIG. 2 is a fragmentary perspective view partly broken away and partly in schematic of the evacuator system of FIG. 1.

With reference to the drawing wherein like numerals represent like parts throughout the several FIGURES, an evacuator system in accordance with the present invention is generally designated by the numeral 10. Evacuator system 10 is employed in an evaporative recovery system designated generally by the numeral 12. Evaporative recovery system 12 is preferably employed for recycling rinse water effluent comprising metal finishing chemicals and rinse water and recovering the chemicals and water by means of a relatively low temperature/vacuum distillation process. The rinse water effluent of the metal finishing system is distilled to form a distilled liquid which is essentially pure distilled water and a concentrated liquid which includes reconcentrated plating bath chemicals. The reclaimed chemicals are returned to the plating bath and the distilled water is returned to the rinse tanks. Arrows designate the general direction of fluid flow in the evacuator system 10.

With reference to FIG. 1, a portion of a metal finishing system is schematically illustrated to depict a plating tank 14, a first rinse tank 16, a second rinse tank 18 and a third rinse tank 20. The foregoing tanks are illustrative of a conventional metal plating system wherein metal objects to be plated are first submerged in plating tank 14 and sequentially rinsed in rinse tanks 16, 18 and 20. The quantity of plating chemical remaining in rinse tank 16 as a result of the rinsing process is generally greater than the residue plating chemical remaining in rinse tank 18 which in turn is greater than the residue chemical remaining in rinse tank 20. The rinse tanks are connected by counterflow conduits 22 and 24 to form a rinse water counterflow from tank 20 to tank 18 to tank 16. The relatively purer rinse water in tank 20 is cyclically transferred to tank 18 and the rinse water tank 18 is cyclically transferred to tank 16. The rinse water in tank 20 is replenished with essentially pure distilled water as will be described below, thus assuring that the last rinse stage employs relatively pure distilled water and that the rinse tanks do not collect excessive quantities of chemical wastes.

The waste or rinse water effluent in rinse tank 16 which may include relatively high concentrates of chemical waste is transferred by means of feed conduit 26 to an evaporator unit 30. Evaporator unit 30 may be either a single effect or a multi-effect evaporator unit which subjects the waste water or source material under a partial vacuum to a temperature below the boiling point of water so that the waste water is distilled to form a concentrate of the plating chemicals and essentially pure distilled water. The illustrated evaporation unit is a double effect unit. A first effect unit is formed by a lower half-shell 32 and an opposing upper half-shell 34. Lower shell 32 connects with feed conduit 26 to receive the waste water from the first rinse tank 16. A steam inlet conduit 36 also connects at lower shell 32 and interiorly communicates with a plurality of small diameter pipes to form a heat bundle 38 within the lower shell. Steam condensate exits via a condensate conduit 37. Waste water surrounding the heat bundle is heated and evaporated by the steam supplied heat to form a hot distillate.

The hot distillate is received in a trough 40 within the upper shell 34 and fed via a transfer conduit 52 to a lower half-shell 44 of the second effect unit. An upper-half shell 46 connects with the lower shell 44 to form a generally fluid tight chamber. The upper shell also connects with a vacuum conduit 56. A partial vacuum is formed in the chamber above the received distillate for facilitating the evaporative process. The vacuum is preferably on the order of 24 to 26 inches of mercury and the temperature in the first effect unit is between 140-160 degrees Fahrenheit with approximately a 10 degree temperature differential between the first and second effect units. The second effect upper shell has a cooling coil assembly 50 which exteriorly communicates with a cooling water conduit 53. A distillate trough 54 collects distillate which has been cooled by the cooling water of the cooling coil assembly 50. The collected distillate is essentially pure distilled water. A critical factor in obtaining the relatively pure distillate is the relatively low temperature employed in the evaporator unit.

The partial vacuum for the recovery system is produced in vacuum conduit 56 by an eductor 60 which employs the cooling water circulation system to create a suitable venturi-type partial vacuum by forcing the cooling water through a restriction. Eductor 60 is formed from plastic such as polyvinyl chloride to prevent corrosion or damage from exposure to corrosive fumes. An eductor discharge conduit 64 leads from eductor 60 to a cooling tower holding tank 66. A cooling water discharge conduit 68 leads from the upper shell 46 and connects with a roof mounted cooling tower 70. A cooling tower return conduit 72 returns cooling water to the cooling tower holding tank 66. Cooling water flows from holding tank 66 to a recirculation pump 74 which forces the cooling water through cooling water conduit 53 and through eductor 60 via eductor input conduit 62. Thus, in a preferred form of the invention, the cooling water circulation system which is employed to cool the distillate is also employed to create the partial vacuum in the evaporator chamber. Eductor 60 may be valved to regulate the partial vacuum in the evacuation system.

Figure 3:
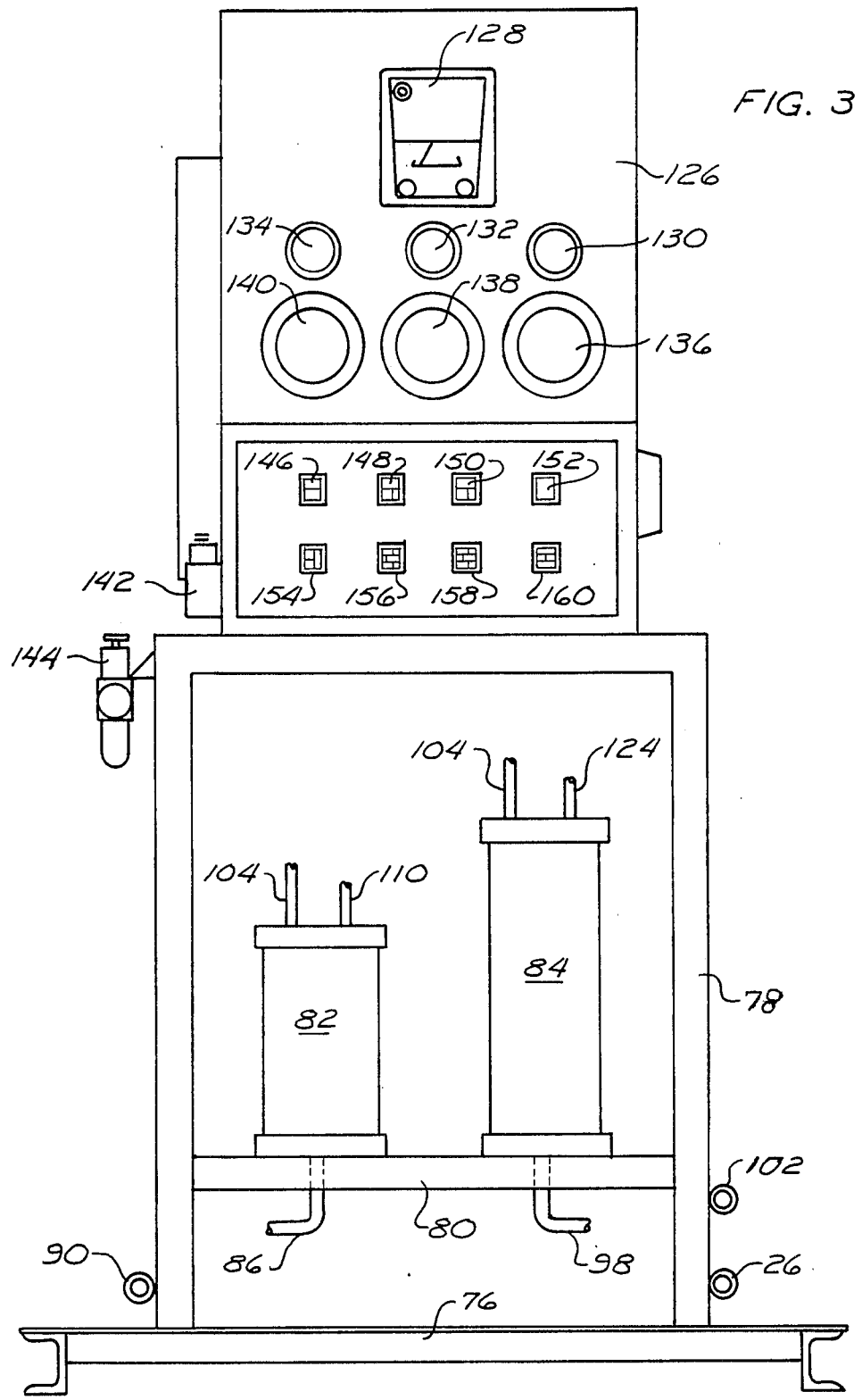
FIG. 3 is a front elevational view illustrating a portion of the evacuator system of FIG. 1.

With further reference to FIG. 3, the foregoing evaporator unit 30 is preferably mounted on a skid 76 which also mounts a support frame 78. A platform 80 of support frame 78 supports a concentrate container 82 and a distillate container 84. The foregoing containers are preferably of cylindrical form and may be formed of lucite, glass or other suitable material which does not react with the plating chemicals or other materials which may be processed by the recovery system. The containers are preferably transparent to afford visual inspection of the recovered liquids received in the containers. A concentrate conduit 86 connects the bottom of lower shell 44 with the lower end of concentrate container 82. Concentrate conduit 86 includes a drain end section which is controlled by a CPVC ball valve 88. Concentrate conduit 86 also connects at an intermediate location with an outlet conduit 90 via a three-way air operated valve 92. Outlet conduit 90 leads to a concentrate holding tank 94 which in turn connects with a return conduit 96 for returning concentrate to the plating tank 14. Alternately, outlet conduit 90 may directly connect with the plating tank 14. The conduits employed for transporting concentrate and distillate in the evacuator system are preferably formed by ½ inch CPVC plastic pipes.

A distillate conduit 98 connects at the back of upper shell 46 and communicates with distillate trough 54 for transferring distillate to the distillate container 84. Distillate conduit 98 connects at a lower end of distillate container 84. A three-way air operated valve 100 controllably connects distillate conduit 98 with an outlet conduit 102. Outlet conduit 102 connects with rinse tank 20 for returning pure distilled water to the final rinse tank. A branch outlet conduit 103 contolled by suitable valves may also be employed to return the recovered distillate to rinse tank 16 and/or rinse tank 18.

Figure 4:
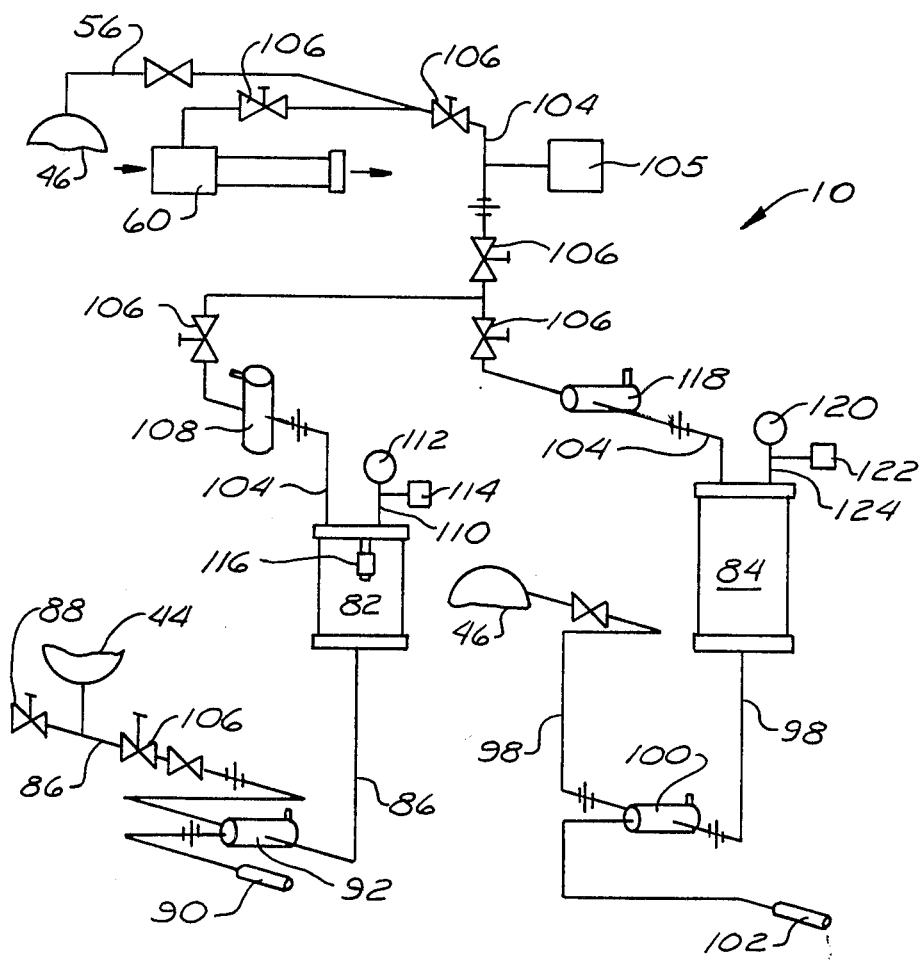
FIG. 4 is a schematic illustration of the evacuator system of FIG. 1.

With reference to FIG. 4, a multi-branched vacuum supply conduit 104 connects to eductor 60 for creating a partial vacuum in the evacuator system. The partial vacuum and air conduits may be formed from ¼ or ⅜ inch rigid PVC plastic pipes. Supply conduit 104 connects with vacuum conduit 56 to provide a vacuum in upper shell 46 for facilitating the foregoing described evaporative process. Supply conduit 104 also branches to connect at upper ends of concentrate container 82 and distillate container 84. A plurality of CPVC ball valves 106 are interposed in supply conduit 104 for manually opening and closing sections of the supply conduit to the vacuum source originating at eductor 60.

A two-way air operated valve 108 is positioned near one end of the supply conduit for selectively opening and closing the conduit 104 to the passage of fluid for purposes of selectively inducing the formation of a partial vacuum in the concentrate container 82. An air conduit 110 also opens into the concentrate container 82 at the upper end thereof. Air conduit 110 functions to transport pressurized air to the concentrate container. The pressurized air may be supplied by conventional means. An air operated air valve 112 is positioned at one end of the air conduit to selectively control the passage of the pressurized air into the concentrate container. Air valve 112 is controlled by a solenoid 114 which receives electric signals from a control unit as will be described below. The solenoid regulates air pressure in an air line leading to valve 112.

The concentrate liquid which remains in lower shell 44 is evacuated from the evaporator unit and transferred to concentrate container 82 by selective operation of valves 92, 108 and 112. Upon closing valve 112 to prevent the passage of pressurized air into the concentrate container, opening valve 108 to produce a partial vacuum within container 82, and opening valve 92 to allow liquid communication from lower shell 44 to container 82, the liquid concentrate in lower shell 44 is forced upwardly in purcolating fashion into concentrate container 82. This latter liquid evacuation occurs due to a greater partial vacuum head in container 82 in relation to the partial vacuum head above the concentrate in the evaporator unit. The partial vacuum in conduit 104, and consequently container 82, may be regulated by a vacuum pressure switch 105. The evacuation of the liquid concentrate to the container 82 continues until the concentrate is exhausted from the lower shell 44, the concentrate flow is manually or automatically terminated, or a concentrate level control switch is actuated. The concentrate level control switch may be a liquid level actuated device such as level control 116 or a timer actuated device (not illustrated) which operates the various control valves in accordance with a pre-established time sequence. When the flow of concentrate into container 82 is terminated, valve 108 closes off communication with the partial vacuum source and the concentrate container is vented to atmospheric pressure.

The concentrate may be purged from container 82 after valve 108 is actuated to close off communication between the container and the partial vacuum source. Air valve 112 is opened to allow pressurized air to rush into the top portion of the concentrate container. Upon actuating valve 92 to permit liquid flow from concentrate conduit 86 to outlet conduit 90, the concentrate is forced from the container by the downwardly exerting air pressure in container 82. The purged concentrate is forced to flow through outlet conduit 90 to the concentrate holding tank 94. The concentrate is ultimately released from the holding tank for return to the plating tank 14. It should be appreciated that the foregoing evacuation of the concentrate from the evaporator unit, the transferal of the concentrate to the concentrate container, the purging of the collected concentrate from the container, and the transferal of the purged concentrate to the concentrate holding tank are accomplished in an efficient manner without requiring electromechanical pumps. The pumpless characteristic of the evacuator system represents a distinct improvement over the electromechanical-type pump systems for transferring liquids because the transported chemicals which are generally corrosive salts, etc. tend to corrode and damage the electromechanical pumps. By connecting both the vacuum supply conduit 104 and the air conduit 110 at the upper end of the container 82 a push-pull type action may be selectively applied to the concentrate.

A second branch of vacuum supply conduit 104 connects via a two-way air operated valve 118 at the top of distillate container 84. An air operated air valve 120 governed by solenoid 122 controls an air conduit 124 leading to the top of the distillate container 84 for selectively introducing pressurized air into container 84. Each of valves 92, 108, 112, 118, 120 and 100 are preferably air operated valves constructed from polypropylene material to eliminate corrosive effects from the chemicals. Each valve includes a spring return and is connected via an air line to an associated solenoid which regulates the air pressure in the air line for operating the valve.

Distillate container 84 receives the pure distillate from the upper shell 46 of the evaporator unit upon selective actuation of valve 112, valve 118 and valve 100 in a manner similar to that previously described for container 82. When air valve 120 is closed to prevent the passage of pressurized air into the distillate container, valve 112 is opened to provide communication between the vacuum source and the distillate container, and valve 100 is actuated to an open position to provide liquid communication from the back of upper shell 46 to the distillate container, the distillate is evacuated from the evaporator unit to the distillate container due to the greater partial vacuum head in the container relative to the partial vacuum head within the evaporator chamber of the evaporator unit. Similarly, the distillate may be purged from distillate container 84 by closing valve 112, opening air valve 120 and opening valve 100 to permit liquid passage from the distillate conduit 98 to the outlet conduit 102 for transferring the pure distillate to the final rinse tank 20.

While the foregoing evacuation system may be automatically controlled as will be described below, the evacuation of liquids from the evaporator unit to the containers and the purging of the collected liquids from the containers may also be accomplished by suitable manual actuation of the various ball valves 106. Similarly, if required such as in the event of system malfunction or an emergency, the operation of the waste recovery system may be manually terminated by appropriate manual operation of valves 88 and 106.

The eductor 60 is preferably employed to provide a partial vacuum source both for the evaporator unit to facilitate the evaporative recovery process and for producing a partial vacuum in the concentrate and distillate containers for facilitating evacuation of the liquids from the evaporator unit. Separate eductor systems may be employed for producing a partial vacuum in the distillate and the concentrate containers. It should be appreciated that separate vacuum sources may also be employed in the evacuator system and the evaporator unit. Although only a single distillate container and a single concentrate container are illustrated and described, it should be appreciated that the evacuative system may employ multiple concentrate and distillate containers which are selectively filled and/or purged as desired.

With reference to FIG. 3, support frame 78 also mounts a control unit 126. Control unit 126 comprises various automatic means for controlling the evacuator system including actuating buttons for initiating and terminating various operations and gauges for monitoring the system. A computer unit is employed to provide an automatic means for operating the evacuator system. The control unit also regulates and monitors the evaporator unit. For example, a temperature control 128 is employed for controlling the temperature in the evaporator unit. A shell temperature gauge 130, a cooling water temperature gauge 132, an air pressure gauge 134, a shell vacuum gauge 136, an eductor pressure gauge 138, and a steam pressure gauge 140 are mounted at the front of the control unit for visual display. An air regulator 142 is provided for regulating the temperature of the evaporator unit.

The evacuator system essentially functions in response to the operation of valves 92, 100, 108, 112, 118, and 120. The latter valves are air actuated valves which operatively connect via air lines (not illustrated) with control solenoids (only solenoids 114 and 122 being illustrated). An air regulator 144 is provided to regulate the air pressure in the air lines which in an actuated state ranges from approximately 45-60 psi. Each of the foregoing valves has an associated solenoid which governs the position of the valve. The solenoids receive electrical signals from a computer unit. The computer unit is programmed to generate various signals for sequentially opening and closing the valves. The computer unit determines the frequency with which the concentrate or distillate is to be evacuated from the evaporator unit or returned to the respective tanks for reuse and generates electrical signals for transmittal to the solenoids. The computer unit may also receive various input signals such as time interval signals, flow rate signals, temperature signals and signals indicative of chemical concentration in the concentrate.

The control unit also preferably includes various indicator lights and/or buttons for monitorning and/or operating the evacuator system, examples of which are briefly described below. Indicator light 146 indicates whether the evacuator system is in an automatic or manual mode. Indicator 148 indicates whether the heat is being supplied to the evaporator unit. Indicator 150 indicates whether the temperature of the evaporator unit is excessive. Indicator light 152 indicates whether the waste from the rinse tank 16 is being transferred to the evaporator unit. Switch 154 is employed to change the evacuator system between an automatic or manual mode. Switch 156 is employed to actuate the system to evacuate distillate to the distillate container 84 and/or purge the distillate from the container. Switch 158 is employed to evacuate concentrate from the evaporator unit to the concentrate 82 container and/or purge the concentrate from the container. Switch 160 is employed to monitor the cooling tower.

While a preferred embodiment of the evacuator system in accordance with the present invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. An automatic evacuator system for transferring liquids in an evaporative recovery system of a type which employs an evaporator unit including an evaporator chamber with separate concentrate and distillate regions and a supply inlet to receive a source material and heating and condensing means to form a concentrate and a distillate from said material by an evaporative process which includes forming a partial vacuum within said chamber and heating the material to a temperature to effect evaporation of said material and condensing the evaporated material in said chamber by means of a cooling liquid flowing through a cooling conduit to form a distillate wherein said concentrate and said distillate are generally segregated into separate regions of said chamber comprising:

an eductor system including an eductor in fluid communication with said cooling conduit to produce a partial vacuum source by passing cooling fluid through said eductor;
a source of pressurized air;
a generally fluid tight concentrate container;
a first inlet conduit and a first inlet valve interposed in said first inlet conduit to provide selective fluid communication between said concentrate region and said concentrate container;
a first vacuum conduit and a first vacuum valve interposed in said first vacuum conduit to provide selective fluid communication between said partial vacuum source and said concentrate container;
a first air conduit and a first air valve interposed in said first air conduit to provide selective fluid communication between said source of pressurized air and said concentrate container;
a first outlet conduit in selective fluid communication with said concentrate container;
a generally fluid tight distillate container;
a second inlet conduit and a second inlet valve interposed in said second inlet conduit to provide selective fluid communication between said distillate region and said distillate container;
a second vacuum conduit and a second vacuum valve interposed in said second vacuum conduit to provide selective fluid communication between said partial vacuum source and said distillate container;
a second air conduit and a second air valve interposed in said second air conduit to provide selective fluid communication between said source of pressurized air and second distillate container;
a distillate outlet in selective fluid communication with said distillate container;
control means to automatically control said first and second conduit valves, vacuum valves, and air valves so that concentrate and distillate may be selectively transferred from said evaporator unit to respective concentrate and distillate containers and selectively purged from the containers to respective first and second outlet conduits.

2. The evacuator system of claim 1 wherein each said valve means is an air-actuated valve and said control means comprises a plurality of solenoids which are actuable for controlling said valve means.

3. The evacuator system of claim 1 wherein the partial vacuum within said chamber is produced by said eductor.

4. The evacuator system of claim 1 wherein at least one of the containers is generally cylindrical in shape and liquid passes into said container from said evaporator at one end of the container and said pressurized air and said vacuum source communicates from the other end of the container.

5. The evacuator system of claim 1 wherein said first outlet conduit connects said first inlet conduit, said first inlet conduit valve being a three-way valve selectively controlling the passage of liquid through said first inlet conduit and said first outlet conduit.

6. The evacuator system of claim 1 wherein said second outlet conduit connects said second inlet conduit, said second inlet valve being a three-way valve selectively controlling the passage of liquid through said second inlet conduit and said second outlet conduit.

7. In an evaporative recovery system wherein a source material is heated to a temperature under a partial vacuum to effect evaporation of said material to form a concentrate and evaporated material and said evaporated material is condensed by means of a flowing cooling liquid to form a distillate, a method for transferring the concentrate to a concentrate container and the distillate to a container comprising:

a. employing the flowing cooling liquid to produce a partial vacuum source by educting means;
   b. providing a first fluid communication path between said distillate and said distillate container;
   c. selectively connecting said distillate container to said partial vacuum source to thereby draw distillate into said distillate container;
   d. providing second fluid communication path between said concentrate and said concentrate container;
   e. selectively connecting said concentrate container to said partial vacuum source to thereby draw concentrate into said concentrate container.

8. The method of claim 7 further comprising the steps of:

f. providing a source of pressurized air;
   g. closing at least one container to fluid communication with said vacuum source;
   h. injecting compressed air into at least one closed container to thereby force fluid from the said container.

9. The method of claim 7 further comprising the step of:

i. employing the partial vacuum source to produce the partial vacuum in the evaporative recovery system.

* * * * *

UNITED STATES PATENT AND TRADEMARK OFFICE
CERTIFICATE OF CORRECTION

PATENT NO. : 4,613,412
DATED : September 23, 1986
INVENTOR(S) : John T. MacDermid It is certified that error appears in the above-identified patent and that said Letters Patent is hereby corrected as shown below:

Claim 7, line 8, after "a" insert -- distillate --.

Signed and Sealed this

Sixteenth Day of December, 1986

*Attest:*

DONALD J. QUIGG

*Attesting Officer*   *Commissioner of Patents and Trademarks*